Dec. 22, 1936. J. H. WOOLL Re. 20,215

REFRIGERATED PACKAGE

Original Filed Aug. 21, 1933 2 Sheets-Sheet 1

INVENTOR.
JOHN H. WOOLL
BY Robert H. Eckhoff
ATTORNEY.

REFRIGERATED PACKAGE

Original Filed Aug. 21, 1933 2 Sheets-Sheet 2

INVENTOR.
JOHN H. WOOLL
BY Robert H. Eckley
ATTORNEY

UNITED STATES PATENT OFFICE 20,215

REFRIGERATED PACKAGE

John H. Woolf, San Francisco, Calif.

Original No. 2,045,627, June 30, 1936, Serial No. 686,024, August 21, 1933. Renewed January 20, 1936. Application for reissue September 5, 1936, Serial No. 99,663

28 Claims. (Cl. 62—91.5)

This invention relates to a refrigerated package, particularly one employing solid $CO_2$ as the refrigerant.

Heretofore, for example, ice cream manufacturers have shipped and delivered packages containing ice cream and frozen puddings and other perishable, frozen products wherein the packaged article was refrigerated by solid $CO_2$. However, the refrigerant was either merely thrown in the container about the packaged article or was otherwise placed in the package so that the article was unduly cooled—cooled to such a low temperature that the article could not be served or eaten with facility because the article was frozen to a hard, rigid state instead of only to a semi-plastic consistency. When it is pointed out that solid $CO_2$ has a temperature approximating −110° F., and that this extremely cold refrigerant is allowed to act more or less uncontrolled, the aforementioned difficulties are apparent.

Solid $CO_2$ is relatively inexpensive and the practice heretofore has been to employ a considerable quantity in a single package. However, the control and protection maintained for the refrigerant has been relatively ineffective so that while the packaged article was at first cooled to a very low temperature, after ten or twelve hours had elapsed, the refrigerant protection of the solid $CO_2$ was exhausted and spoiling of the product resulted.

In accordance with the present invention, the refrigerating effect of the solid $CO_2$ is controlled to the end that the packaged article is maintained at a suitable and a desired temperature over a relatively long period of time, less solid $CO_2$ is required, and the package is refrigerated for a much greater length of time than has been attained heretofore.

Prior to the commercial introduction of solid $CO_2$, ice and mixtures of ice and salts, as rock salt, were commonly employed to refrigerate perishable products. Due, however, to the weight, space requirements, the necessity of collecting used containers and the investment in these, as well as to the troublesome nature of these refrigerants, solid $CO_2$ has largely displaced these refrigerants. Some manufacturers and purveyors still insist upon their use because of the aforementioned difficulties with the solid $CO_2$, and because the temperature of ice is better suited to the refrigeration of these perishable products, as well as beer, flowers, fish, shell fish, fruits, vegetables, and the like, than that of solid $CO_2$. In accordance with this invention, I am enabled to provide the refrigerating effect of ice with solid $CO_2$ while avoiding those difficulties attendant upon the use of ice heretofore.

It is in general the object of the present invention to provide a refrigerated package wherein solid $CO_2$ is employed to provide the cold source but wherein the refrigerating temperature is maintained at approximately that of ice.

Another object of the present invention is to provide an improved refrigerated package.

Another object of the present invention is to provide a solid $CO_2$ package, the effective refrigerating temperature of which is maintained at substantially that of ice even though the block of solid $CO_2$ originally provided has shrunk in size.

The invention possesses other advantageous features and objects, some of which, together with the foregoing, will appear in the following, wherein a present preferred package of my invention is disclosed.

Figure 1:
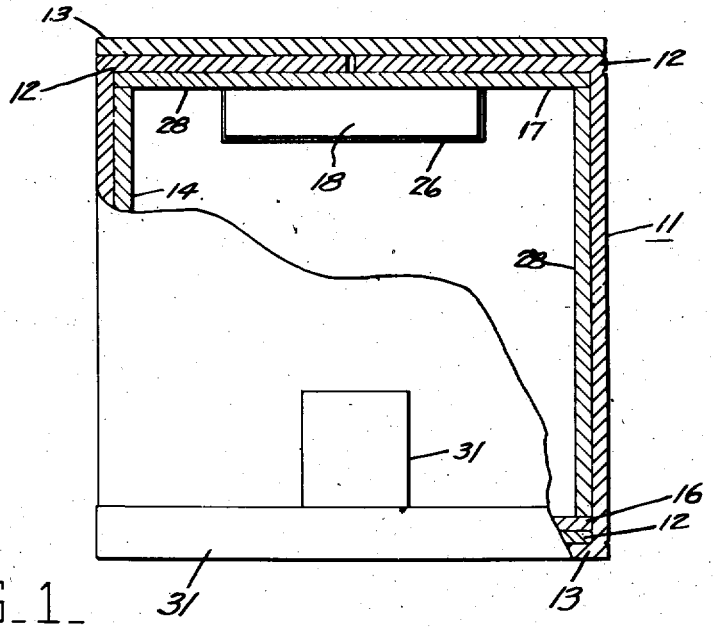
Figure 1 is a side elevation, partly in section, of a package of my invention.

In Figure 1 I have shown my invention as applied to a package for products to be refrigerated. This package is formed of a four-sided outer container 11 having end flaps 12 folding inwardly from one pair of opposite sides to provide a first cover and other end flaps 13 folding inwardly from the other pair of opposite sides to provide a second and an outer cover. The container is formed of any suitable material having a high heat insulating value. In the preferred package, I have used successfully the ordinary corrugated paper board construction, although other suitable boards as straw board can be used.

An inner liner 14 is inserted in the container 11. In the preferred form, this has consisted of a sheet of double corrugated paper board folded to conform to the container and to be insertable therein. Of course, another form of liner can be used or omitted if desired, if the outer walls are alone sufficiently effective.

An end piece 16 is positioned between the liner and the flap 12, and a similar piece 17 is placed at the top so that the whole container is more or less of a uniform thickness. These pieces are conveniently made of the same material as the liner 14.

I have found that the effectiveness of the unit is increased if the interior surface 28 of the liner and the pieces 17 and 18 are bright and of a reflecting nature. Thus by covering these with polished tin or lead foil, a metallic foil of high lustre and polish, or by painting them with a metallic paint or otherwise giving them a bright surface, the unit will be maintained cold for a longer period. In practice, the liner and other pieces are painted with an aluminum paint and then buffed so as to improve its reflective quality.

It is a feature of the package of my invention that by lining the interior of the package with a sheath of thin metal, for example, the passage of moisture out of the interior of the package is prevented. While a first impression is usually that this is not of consequence, it is nevertheless a material advantage, an advantage readily recognized when it is pointed out that paper boxes are subject to failure mechanically if subjected to a moist atmosphere. Thus, a paper box filled with fruit, or other water containing material, able to give off moisture, will, if placed in cold storage, fail mechanically because the moisture from within the box passes into the paper board. However, if the box be first lined with the foil, for example, the box is able to resist the internal humidification and the external cold atmosphere which acts, in the absence of the foil, to desiccate the fruit, pulling the moisture continually out of the fruit and into the box wherein it causes mechanical failure. In this manner the refrigerated package of my invention successfully resists what can be termed self-destruction. Instead of utilizing a container 18 which is made of absorbent material, the container can be lined or coated with an absorbent material or fabric which can be saturated.

The package described is useful in the handling of perishable products requiring the protection of a low temperature and, possibly in addition, protection against desiccation. It can be refrigerated in any suitable manner, but I prefer to use solid $CO_2$ packaged in the manner hereinafter described.

Figure 2:
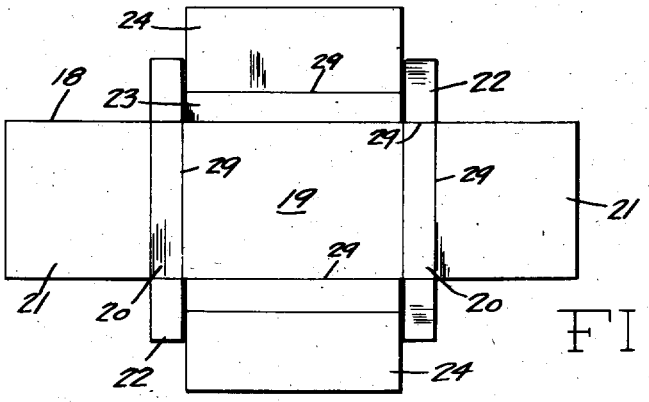
Figure 2 is a plan view of a container for the solid carbon dioxide.
Figure 3:
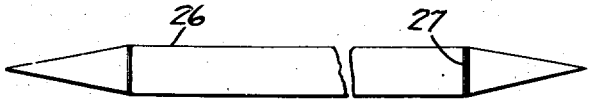
Figure 3 is a plan view of a clip.

The solid $CO_2$ is preferably positioned at the top of the container 11, conveniently on the piece 17 so that it is readily positioned after the container is filled. In accordance with this invention, the $CO_2$ is carried in a container 18 formed of water absorbing material or including such a material. As appears in Figure 2, the container 18 is made from a single sheet to include base 19, end walls 20 and end flaps 21, which fold relative to each other on crease lines 29 to provide a container in which the end flaps overlap as appears in Figure 4. The end walls 20 include extensions 22 which fold inwardly to seal the ends. Side walls 23 and side flaps 24 fold on crease lines 28 relative to the rest of the blank respectively, to engage extensions 22 and overlie the overlapping end flaps 21. The container described has proven particularly effective and efficient in packaging the solid $CO_2$. Usually a block 30 of the compressed and solid $CO_2$ of the size of base 19 is inserted in the container. In this way, uniform refrigeration of different packages is assured.

In accordance with my invention, prior to the time when the container 18 is filled with ice, it is dipped into water or a brine, or otherwise wetted, preferably saturated, so that when the solid $CO_2$ is placed therein and the container closed, the various parts freeze together to provide a practically sealed container for the solid $CO_2$. At the same time, the $CO_2$ becomes virtually sealed within a solid block of ice so that its refrigerating effect is reduced to that of ice and packaged products in the container are not chilled any more than as if ice were used.

While the previously described structure is satisfactory, I have found that more uniform refrigeration over a longer period is secured by providing a film or sheet of a good heat conductor adjacent the solid $CO_2$ and preferably contiguous thereto so as to be in contact with the solid $CO_2$ in the container. Thus in Figure 4 I have shown a sheet 25 of metal upon which the solid $CO_2$ rests. Tests I have made show that a more uniform temperature is maintained and over a longer period of time when this is used, even though the metal sheet or film was relatively very thin—virtually as thin as a film of metallic paint. In addition, when the metal is omitted, the frozen container softens at the corners and edges, allowing the $CO_2$ gas to escape more readily, as well as preventing uniform refrigeration.

Figure 4:
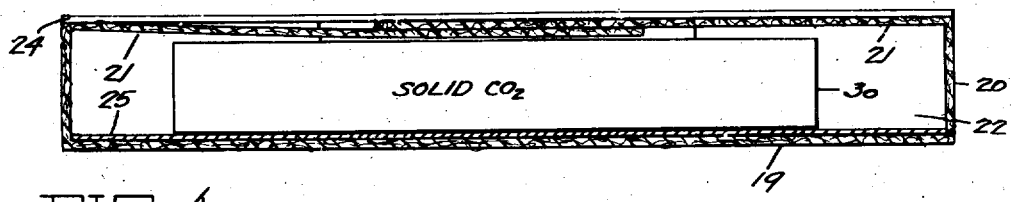
Figure 4 is a section through the assembled container of Figure 2.
Figure 5:
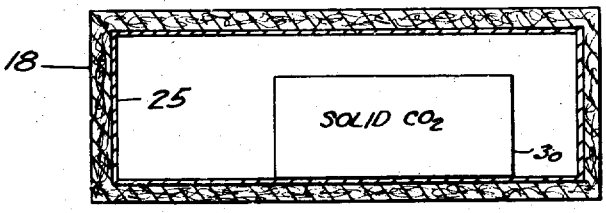
Figure 5 and Figure 6 are sections through other containers for solid carbon dioxide.
Figure 6:
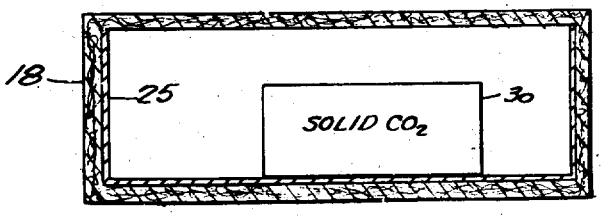

The metal film or sheet can extend entirely about the solid $CO_2$, as disclosed in my aforementioned application, to provide a cage therefor, or it can extend only partially, as appears in Figures 4 and 6. In either case, it provides a certain mechanical protection, as well as equalizing and distributing the heat absorbing effect of the solid $CO_2$. The film or sheet can be porous, as a wire cage or screen, if desired, and is preferably inside the outer absorbent material so that the outer ice shield is cooled uniformly. Such packages are useful not only in connection with a container 11 as that disclosed, but also in refrigerating boxes of fish, fruit, etc., as a refrigerating unit. These can be made up directly at the plant producing the solidified $CO_2$, if desired. Instead of absorbent paper, a fabric or other absorbent can be used, if desired. Somewhat the same effect as wetting the absorbent can be obtained by exposing the cold dry package to the atmosphere of the container, particularly a moist one; wetting of the material surrounding the solid $CO_2$ and formation of the ice film can be obtained in this manner.

The container 18 is secured in place by a metal strip 26 pointed at both ends. The ends are bent on the crease lines 27 to form a U to receive the container, the pointed ends being forced through the top piece 18 and bent over. With a large container 11, extra containers 18 can be suspended in the container 11 as by screens, webs, or perforated sheets, or placed among the packages in the container.

After the container 11 is made up, the flaps are secured by suitable fasteners, preferably adhesive tape 31, so that a sealed unit is provided. If desired, a vent tube can be extended from the $CO_2$ container to the atmosphere if it is desired that products in the container 11 not come into contact with this gas. Thus, a short tube can pass between the flaps to seal that small opening providing a ready escape to the atmosphere.

It is to be understood that various changes and modifications can be made herein within the spirit of my invention as defined in the claims. Also, the term "package", as used herein and in the claims, is intended to include not only those structures commonly recognized as such, but also structures such as a refrigerator of a more or less permanent nature—and other containers and receptacles suited to the purpose and adapted to cooperate with embodiments of features of my inventions to provide useful and advantageous structures.

I claim:

1. A package of carbon dioxide in solid form enclosed in absorbent material impregnated with ice and including a metallic sheet member between the carbon dioxide and the material.

2. A package of carbon dioxide in solid form enclosed in absorbent material impregnated with ice, said package including a metallic sheet member between the carbon dioxide and the material.

3. Means for packaging a block of solid $CO_2$ comprising a cage for said block and a casing of fibrous material for both said cage and said block, said fibrous material being wetted with a material frozen by carbon dioxide ice so that said fibrous material is impregnated with ice.

4. A package for solid carbon dioxide including an absorbent container and an inner metallic lining, said container being wetted with a liquid frozen by solid carbon dioxide in said container so that said container becomes impregnated with ice to control refrigeration thereby.

5. A package for solid carbon dioxide including an absorbent container impregnated with ice and an inner metallic lining at least partially surrounding solid carbon dioxide therein.

6. A package comprising a heat insulating container, and a refrigerating unit therefor comprising an ice impregnated container for carbon dioxide in solid form and a metal sheet member adjacent said carbon dioxide.

7. A package comprising a heat insulating container, and a refrigerating unit therefor comprising an ice impregnated container for carbon dioxide in solid form and a metal sheet member contiguous to said carbon dioxide.

8. A refrigerator package comprising a heat insulating container having its interior surfaces covered with a polished metal foil of a light reflecting nature, and a container for carbon dioxide in solid form including an absorbent material saturated with a liquid frozen by the solid carbon dioxide to provide a refrigerating unit for said outer container.

9. A refrigerator package comprising an outer heat insulating container having its interior surfaces covered with a polished metal foil of a light reflecting nature, a closure member for said outer container, an inner container for carbon dioxide in solid form carried by said member and including an absorbent material saturated with a liquid frozen by the solid carbon dioxide to provide a refrigerating unit in a humidifying relation with said outer container.

10. A refrigerating unit for a package having products therein in a moisture containing atmosphere, said unit comprising solid carbon dioxide enclosed in absorbent material which is exposed to said atmosphere and which is ice impregnated to maintain a desired humidity in said package.

11. A refrigerating unit for a package having products therein in a moisture containing atmosphere, said unit comprising solid carbon dioxide and a metal sheet member enclosed in absorbent material which is exposed to said atmosphere to become ice impregnated.

12. A package comprising a main container, and means for controlling evaporation of a carbon dioxide refrigerant therein comprising a refrigerant container adapted for ice impregnation situated in humidifying communication with said main container and exposed to the atmosphere in said main container.

13. A package for solid carbon dioxide comprising a metallic support for said solid carbon dioxide, and an outer container for said support, said outer container being of absorbent material and impregnated with a material frozen by said solid carbon dioxide.

14. A package for solid carbon dioxide comprising a metallic member adjacent said solid carbon dioxide, and an outer container for said member, said outer container being of absorbent material and impregnated with a material frozen by said solid carbon dioxide.

15. A refrigerated package comprising a box formed of paper board and having interior end and side walls, a thin metallic foil sheet of high lustre and polish attached to each of said walls, to provide an interior lining for said box, and a package of solid carbon dioxide enclosed in an ice impregnated absorbent material positioned inside said box.

16. A refrigerated package comprising a box formed of paper board and having interior end and side walls, a thin metallic foil sheet of high lustre and polish attached to each of said walls, to provide an interior lining for said box, and a package of solid carbon dioxide enclosed in an ice impregnated absorbent material positioned inside said box, said package including a metallic sheet member between the carbon dioxide and said absorbent material.

17. In combination with a box formed of paper and corrugated paper secured together in board form with an adhesive to provide an interior space for products, said box being subject to failure as a mechanical structure upon prolonged subjection to a humid atmosphere, a bright metal foil sheath attached to the innermost surfaces of said box to form a substantially continuous metal sheath lining protecting said board against failure due to a humid atmosphere in said space; means providing a substantially humid atmosphere in said space, and means for refrigerating said space.

18. In combination with a box formed of paper and corrugated paper secured together in board form with an adhesive, to provide an interior space for products, said box being subject to failure as a mechanical structure upon prolonged subjection to a humid atmosphere, a bright metal foil sheath attached to the innermost surfaces of said box to form a substantially continuous metal sheath lining protecting said board against failure due to a humid atmosphere in said space; means providing a cold but humid atmosphere in said space.

19. A package comprising a heat insulating container, and a refrigerating unit therefor comprising an absorbent container for solid carbon dioxide, said container being ice impregnated, exposed to the atmosphere in the refrigerator and positioned in said heat insulating container to humidify said container.

20. A refrigerator package comprising an outer heat insulating container, and an inner container for carbon dioxide in solid form including an absorbent material exposed to the atmosphere in said outer container and saturated with a liquid frozen by the solid carbon dioxide to provide a refrigerating unit in a humidifying relation with said outer container.

21. A refrigerator package comprising an outer heat insulating container formed of corrugated paper board, and a container for carbon dioxide in solid form within said outer container and including an absorbent material exposed to the atmosphere in said outer container and only saturated with a liquid frozen by the solid carbon dioxide to provide a refrigerating unit in a humidifying relation with said outer container even after said solid carbon dioxide is exhausted without releasing said liquid into said container as it melts.

22. A refrigerator package comprising an outer heat insulating container formed of corrugated paper board, and an inner container for carbon dioxide in solid form supported in an upper portion of said outer container and including an absorbent material exposed to the atmosphere in said outer container and saturated with a liquid frozen by the solid carbon dioxide to provide a refrigerating unit in a humidifying relation with said outer container even after said solid carbon dioxide is exhausted without dropping liquid in said absorbent material on products in said outer container.

23. A refrigerator package comprising an outer heat insulating container formed of corrugated paper board, an inner container for carbon dioxide in solid form supported in the upper portion of said outer container and including an absorbent material exposed to the atmosphere in said outer container and impregnated with ice to provide a refrigerating unit in a humidifying relation with said outer container.

24. In combination with a box formed of paper and corrugated paper secured together in board form with an adhesive, to provide an interior space for products, said box being subject to failure as a mechanical structure upon prolonged subjection to a humid atmosphere; a bright metal foil sheath attached to the innermost surfaces of said box to form a substantially continuous metal sheath lining protecting said board against failure due to a humid atmosphere in said space; and means positioned inside said box and in contact with the atmosphere therein for maintaining said atmosphere cold and humid.

25. In combination with a box formed of paper to provide an interior space for products, said box being subject to failure as a mechanical structure upon prolonged subjection to a humid atmosphere, a bright metal foil sheath attached to the innermost surfaces of said box to form a substantially continuous metal sheath lining protecting said board against failure due to a humid atmosphere in said space; means providing a substantially humid atmosphere in said space, and means for refrigerating said space.

26. In combination with a box formed of paper to provide an interior space for products, said box being subject to failure as a mechanical structure upon prolonged subjection to a humid atmosphere, a bright metal foil sheath attached to the innermost surfaces of said box to form a substantially continuous metal sheath lining protecting said board against failure due to a humid atmosphere in said space; means providing a cold but humid atmosphere in said space.

27. In combination with a box formed of paper to provide an interior space for products, said box being subject to failure as a mechanical structure upon prolonged subjection to a humid atmosphere; a bright metal foil sheath attached to the innermost surfaces of said box to form a substantially continuous metal sheath lining protecting said board against failure due to a humid atmosphere in said space; and means positioned inside said box and in contact with the atmosphere therein for maintaining said atmosphere cold and humid.

28. In combination with a box formed of paper to provide an interior space for products, said box being subject to failure as a mechanical structure upon prolonged subjection to a humid atmosphere; a bright metal foil sheath attached to the inner most surfaces of said box to form a substantially continuous metal sheath lining protecting said board against failure due to a humid atmosphere in said space; and a package of solid carbon dioxide enclosed in an ice impregnated material and positioned inside said box to cool and humidify said space.

JOHN H. WOOLL.